Feb. 10, 1970  V. M. KAZANSKY  3,495,114
CYLINDRICAL AND DISC STATORS FOR ELECTRICAL MACHINES
HAVING COMPOSITE WINDINGS
Filed June 14, 1968  3 Sheets-Sheet 1

United States Patent Office 3,495,114
Patented Feb. 10, 1970

3,495,114
CYLINDRICAL AND DISC STATORS FOR ELECTRICAL MACHINES HAVING COMPOSITE WINDINGS
Vasily Mikhailovich Kazansky, Prospekt Karla Marxa 35, kv. 37, Novosibirsk, U.S.S.R.
Filed June 14, 1968, Ser. No. 737,102
Int. Cl. H02k 1/12, 3/04
U.S. Cl. 310—179          1 Claim

ABSTRACT OF THE DISCLOSURE

A stator for an A.C. machine is composed of a yoke with coil groups consisting of a distributed active layer arranged on the yoke and formed by stacks of alternating winding conductors and ferromagnetic elements separated from each other by a layer of insulating material, and end windings connecting the stacks.

The present invention relates to the design of electrical machines and, in particular, to the design of A.C. machine stators.

It is known that the winding and insulating processes in the manufacture of such stators are time-consuming and are difficult to mechanize and automate. An especially great amount of time is required for the production of stator windings and in most cases the winding operations are performed by hand or are only slightly mechanized.

Known in the art are A.C. machine stators designed so as to simplify the process of manufacturing of the stator windings and reduce the amount of work required for their production. According to one of these designs, the machine is fitted with a composite stator, the inner rim of which is wound on a former made of continuous electrical steel tape and provided with stamped slots. Then the winding is laid from the outside into the slots, the yoke is seated on top and secures teeth of the inner rim by means of a dovetail joint. After that, the former is removed and the internal part of the stator is bored to the required diameter.

The design of another type of composite stator is based on a similar principle according to which the inner rim comprising the toothed layer is wound on a tapered former. After the stator windings have been laid in the slots from the outside and the outer yoke has been seated, the former is withdrawn axially and the inner rim which has been coated preliminarily with a cementing material becomes fixed reliably to the yoke owing to the taper of the former.

The above-mentioned composite stators make it easier to lay the windings in the slots. Nevertheless, the amount of time saved in laying the winding is very slight. Besides that, additional difficulties arise when joining the inner rim and the yoke and certain limitations are imposed on the shape of the end windings. Moreover, local short-circuits in the stator magnetic circuit cannot be absolutely avoided.

Other designs of electrical machine stators, are known, for example, stators with flat printed-circuit windings deposited on the surface of the stator ferromagnetic yoke. The use of printed-circuit windings allows automation of the process of manufacturing of the stator.

However, a major disadvantage of stators with a flat printed-circuit winding is that the active part of the winding producing the required magnetizing force is located within the air gap. This increases the equivalent non-magnetic gap and limits, to a great extent, the utilization of the machine space. For this reason A.C. machine stators with flat printed-circuit windings are not used in modern engineering practice.

Thus, it is evident that the problem of reducing the time and labor consumed by the process of winding the stator has not yet been resolved satisfactorily in spite of the several attempts that have been made to this end.

An object of the present invention is to eliminate the above-mentioned disadvantages of the known methods.

A primary object of this invention is to provide an A.C. machine stator which enables production of electrical machines having a stator bore of practically any shape (cylindrical, end face, conical, etc.) and any pattern of distribution of the magnetic field in the air gap.

This object is attained by the development of a stator with a distributed active layer which consists of stacks of coil groups, each stack comprising alternating winding conductors and ferromagnetic elements separated from each other by a layer of insulating material.

The present invention will further be described by way of example with reference to the accompanying drawings, wherein.

Figure 1:
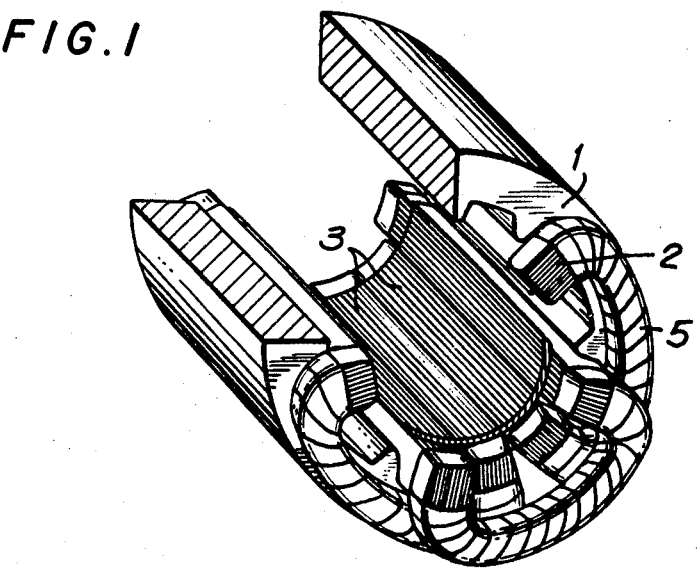
FIG. 1 is a perspective view of a cylindrical stator according to the invention.
Figure 3:
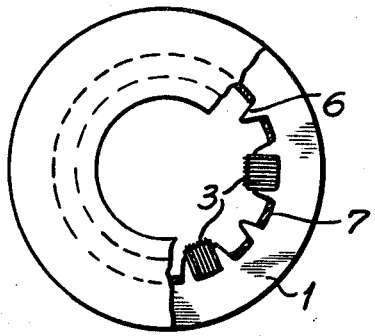
FIG. 3 is an elevation view partly broken away showing the attachment of the stacks to the yoke of the cylindrical stator by means of fixing teeth according to the invention.
Figure 2:
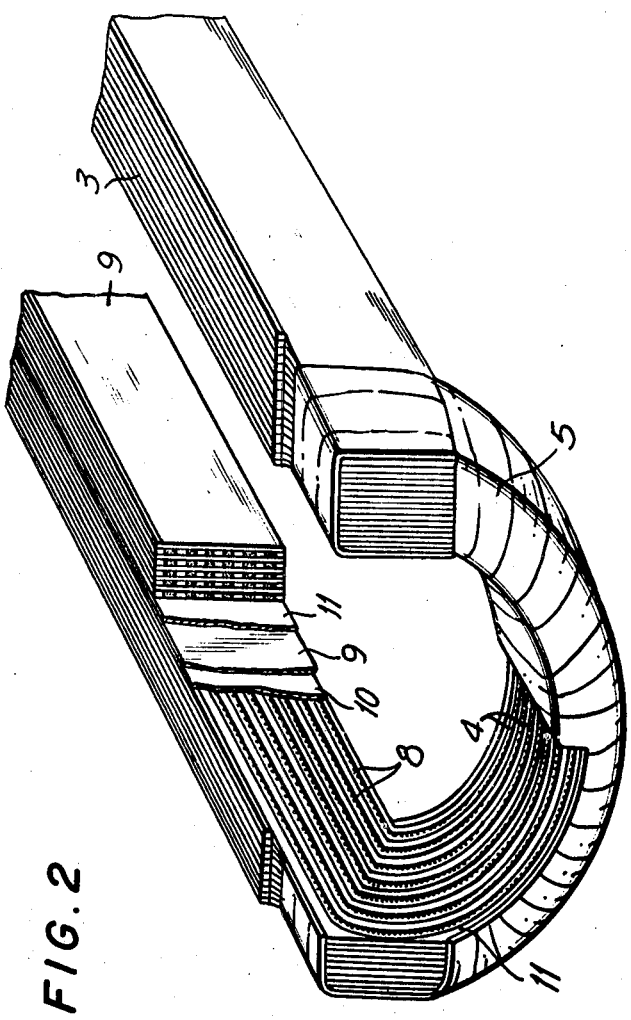
FIG. 2 shows two stacks of a distributed active layer of a cylindrical stator according to the invention.

An embodiment of a cylindrical stator (see FIG. 1) with a distributed active layer is described below. As seen in FIG. 1, such a stator consists of cylindrical yoke 1 and coil groups 2 with active stacks 3 making up the distributed active layer. As seen in FIG. 2, conductors 8 of end face parts 4 of coil groups 2 emerge from stacks 3 and are covered with insulation 5. Stacks 3 can be fixed to yoke 1 by different means, for example, by fixing teeth 6 (see FIG. 3) that prevent displacement of stacks 3 along the perimeter of yoke 1 and by cementing seam 7 that prevents axial displacement of stack 3.

Figure 4:
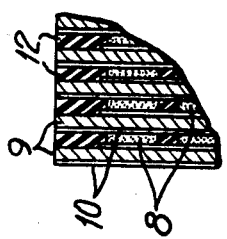
FIG. 4 is a cross-sectional view of a portion of the stack according to the invention.

Stacks 3 constitute the distributed stator layer (see FIGS. 2 and 4) and are built up of alternating conductors 8 (of a printed-circuit type or made of metallic foil or magnet copper wire) and of ferromagnetic elements 9 made of sheet steel. Conductors 8 and ferromagnetic elements 9 are insulated from each other by insulation 10 and 11 (made, for example, of flexible sheet, film or oxidized insulating material) and are cemented together. The space between the ends of ferromagnetic elements 9 protruding beyond conductors 8 are filled with compound 12.

After final assembly, the stator is compounded and baked in order to make it rigid. The required shape, size and evenness of the air gap are established after assembly and compounding, by machining the inside surface of the stator. Any possibility of the ends of ferromagnetic elements 9 being short-circuited during the process of machining is fully eliminated due to the presence of the layer of compound 12 (see FIG. 4).

Figure 5:
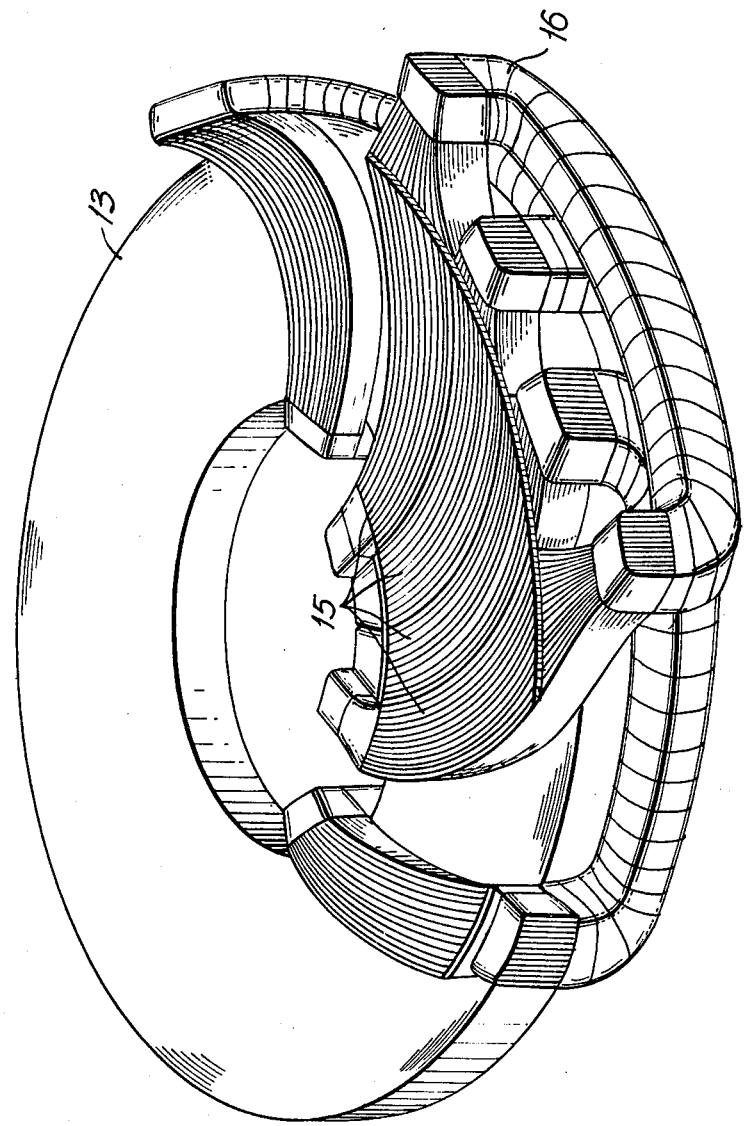
FIG. 5 is a perspective view of an end-face stator according to the invention.

The design of an end-face stator of an A.C. machine is described below. As can be seen from FIG. 5, such a stator consists of yoke 13 with a distributed stator layer thereon constituted by end coil groups 14 and active stacks 15. Stack 15 is made in the same way as the stacks 3 of the cylindrical stator described above. End windings 16 of stack 15 do not contain any ferromagnetic elements, and are curved and covered with insulation.

Figure 6:
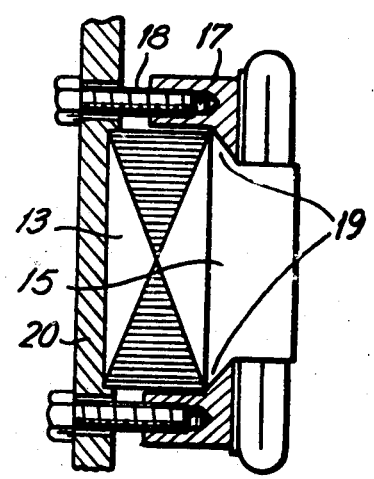
FIG. 6 is a cross-sectional view through the stator of FIG. 5 showing the attachment of a stack to the yoke.

Stacks 15 are mounted on yoke 13 radially. The attachment of stack 15 to yoke 13 is shown in FIG. 6, wherein stack 15 is mounted on stator yoke 13 and is fixed in place by means of ring 17 (or a part of a ring) and, also, by screws 18 and dovetail joint 19, at each edge of stack 15, the yoke 13 being retained in a recess in a cover 20 which is secured to ring 17 by screws 18.

Before fixing stacks 15 to yoke 13, the stacks 15 (see FIG. 5) are bent along an evolute arc in the plane of the air gap, this being done for reasons of stability. Due to the radial position of the stacks 15, the stacks are flared radially outwards to prevent the formation of spaces between adjacent stacks. Thereby wedge-shaped spaces, widening radially outwards, are formed between adjacent conductors 8. The ferromagnetic elements are formed with a corresponding wedge shape to compensate and enable the conductors to have a rectangular cross-section. With this construction the entire yoke surface can be utilized.

The herein proposed design of the sator with a distributed active layer is suitable for use in synchronous, induction, inching and other special types of electrical machines.

Thus, the invention proposed herein allows separate manufacture of the stator yoke and distributed winding layer, the main advantage of this invention being that the herein proposed design does not involve laying the winding in stator slots and, as a result, enables reduction of the time required for production of the stator.

Moreover, the stator design proposed herein enables the employment of advanced methods (for example, printed-circuit emthods) of manufacturing the stator winding and the automation of winding operations.

The stator proposed herein is of simple design and its manufacture does not require the use of complicated stator iron stamps.

Furthermore, the present invention enables the production of electrical machines having practically any required number of phases and poles.

It is to be noted that the principle on which this invention is based can be utilized for the fanufacturer of A.C. machine rotors for practically any shape of the stator bore.

Additionally, owing to the great variety of spatial arrangements of the winding conductors and ferromagnetic elements, the herein proposed design of the stator and the distributed active layer provides for a corresponding variety of distribution of the magnetic field within the air gap.

What I claim is:

1. An electrical machine stator having a yoke with a distributed active layer arranged on the yoke, wherein the active layer consists of stacks of alternating winding conductors and ferromagnetic elements separated from each other by a layer of insulating material.

References Cited

UNITED STATES PATENTS

| | | | |
|---|---|---|---|
| 2,011,114 | 8/1935 | Papin | 310—180 |
| 2,873,395 | 2/1959 | Kober | 310—268 X |
| 3,097,319 | 7/1963 | Henry-Baudot | 310—179 |
| 3,176,176 | 3/1965 | Willyoung | 310—208 |
| 3,252,027 | 5/1966 | Korinek | 310—198 |

WARREN E. RAY, Primary Examiner

U.S. Cl. X.R.

310—195, 208, 214, 254